FACSIMILE TRANSMITTER SCANNING SYSTEM

Filed Dec. 18, 1946 3 Sheets-Sheet 1

INVENTOR.
William G. H. Finch
BY Gottfried H. Hohmann
Ostrolenk & Faber
ATTORNEY.

May 2, 1950 W. G. H. FINCH ET AL 2,506,017

FACSIMILE TRANSMITTER SCANNING SYSTEM

Filed Dec. 18, 1946 3 Sheets-Sheet 2

INVENTORS

William G. H. Finch

BY Gottfried H. Hohmann

Ostrolenk & Faber

ATTORNEYS

May 2, 1950 W. G. H. FINCH ET AL 2,506,017

FACSIMILE TRANSMITTER SCANNING SYSTEM

Filed Dec. 18, 1946 3 Sheets-Sheet 3

INVENTORS

William G.H. Finch

BY Gottfried H. Hohmann

Ostrolenk & Faber

ATTORNEYS

Patented May 2, 1950 2,506,017

UNITED STATES PATENT OFFICE 2,506,017

FACSIMILE TRANSMITTER SCANNING SYSTEM

William G. H. Finch, Newtown, Conn., and Gottfried H. Hohmann, Bronx, N. Y., assignors, by mesne assignments, to Pierce Company, Providence, R. I.

Application December 18, 1946, Serial No. 717,020

7 Claims. (Cl. 178—13)

Our present invention relates to facsimile transmitters and more particularly to a scanning device of the type which is fed longitudinally with respect to a radially rotating drum.

The type of scanning device which our present invention contemplates is that generally described in Patents Nos. 2,295,572 and 2,185,806. Essentially the transmitter comprises a rotating drum around which a sheet carrying the image to be transmitted is wrapped. As the drum rotates radially, a photo-optic system is forced to move longitudinally of the drum so that a combination of the radial rotation of the drum and longitudinal movement of the photo-optic system results in a helical scanning line about the drum. Depending upon the speed of the drum and the rate of movement of the photo-optic system with respect to the drum from sixty to two hundred scanning lines per inch may be obtained as a helical trace about the drum.

The photo-optic system ordinarily consists of a line source and means for focusing the light from the light source into a spot having a diameter approximately equal to the width of one of the scanning lines or narrower than the same. The photo-optic scanning system also includes another optical system for picking up the reflected light spot and transmitting the same to a photo-sensitive medium which translates the variations in the intensity of the light spot into variations in intensity of electrical impulses which may then be amplified and transmitted by radio or wire to a receiver.

It is common in the operation of such scanning systems to feed the complete photo-optic system longitudinal of the drum by a low pitch screw which results in a relatively slow speed movement of the photo-optic system with respect to the drum moving approximately at a speed of one inch per minute and thus taking approximately eight minutes for an eight inch wide drum.

Also it has been common previously to provide some means for disconnecting the photo-optic scanning system from the screw so that the photo-optic system may be quickly returned to the beginning for commencing a new scanning operation without waiting for the slow operation which would result from mere reversal of the scanning screw.

A specific and important object of our invention is the provision of simplified and novel mechanical means for rapidly returning the scanning apparatus to the beginning of the scanning region without the intervention of any manual controls of any kind.

A further object of our invention is the provision of automatic means for rapidly returning the scanning apparatus to the beginning of the scanning stroke at the beginning of a scanning operation.

Another object of our invention is the provision of novel means for halting and rapidly returning the scanning apparatus to the beginning of the scanning stroke after the scanning apparatus has completed any part of its scanning operation.

Another object of our invention is the provision of a novel high pitch screw in conjunction with a low pitch screw to provide for a fast return of the scanning apparatus to the beginning of the scanning stroke.

A further object of our invention is the provision of a novel construction for a screw wherein a high pitch screw may be obtained by winding a rectangular bead or wire around a shaft and soldering the bead or wire thereto.

The foregoing and many other objects of our invention will become apparent in the following description and drawings in which.

Figure 1:
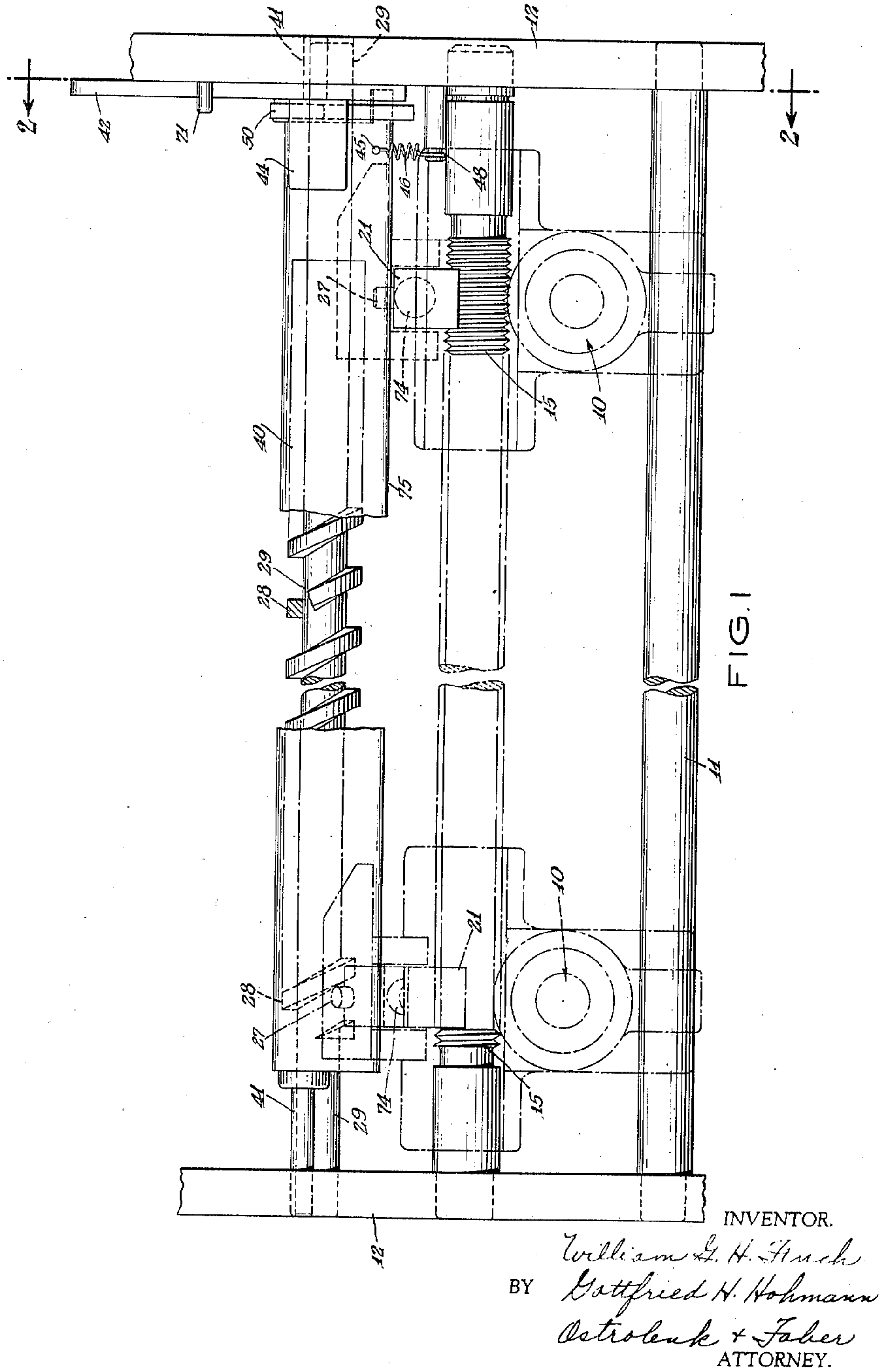
Figure 1 is an elevation partly in cross section of our novel scanning system.

Referring now to the figures, the drum, not shown, is located in front of the optical system 10 which performs the scanning operation in the manner previously described, the said optical system 10 being shown schematically. The optical system 10 is provided with a lower support 11 comprising a bar carried between the two side frame members 12—12, the said bar being engaged by the lower notch 13 of the housing for the scanning system 10.

The scanning system 10 may also be supported by other longitudinal horizontal bars engaging various portions thereof. The particular supports for the scanning system comprise no part of our invention but may be of the type generally shown in the above mentioned Patents Nos. 2,295,572 and 2,185,806.

The screw 15 is rotatably supported within the side frame members 12, 12 and is driven in any suitable manner from the appropriate power source, the power source being geared to synchronize with the rotation of the drum in order to obtain appropriate helical scanning.

The housing 10 carries secured thereto in any suitable manner, as on the pivot 20, the lever 21. The housing also carries secured thereto in any suitable manner as by the screw 22, the spring 23 which spring bears against the under side of the lever 21 in order to bias the left hand end of the lever upwardly with respect to Figure 2, or to bias the lever towards rotation in a counterclockwise direction.

The right hand end of the lever at its lower surface is provided with the half nut 25 which engages the screw 15 and this interengagement of the half nut 25 with the screw 15 provides for the scanning movement in a longitudinal direction at slow speed of the scanning system housing 10. This interengagement is maintained as above pointed out by the spring 23 when the lever 21 is rotated in a counterclockwise direction with respect to Figure 2 to raise the right hand end of the lever 21 to cause the upper projection 27 of the right end of lever 21 to engage the high pitch thread 28 on the shaft 29. The high pitch thread 28 on shaft 29 is a rectangular bar bent around the shaft 29 and soldered thereto.

The shaft 29 rotates in an opposite direction from that in which the screw 15 rotates so that with the thread 28 in the same sense as the thread of screw 15, the operative action of the high pitch thread 28 will be to return or move the scanning system back towards the beginning. The high pitch thread 28 also provides for an extremely rapid return.

Our novel device is arranged ordinarily so that the half nut 25 of lever 21 on the scanning housing 10 engages the slow speed scanning screw 15. When, however, the latch elements hereinafter described are tripped, the projection 27 of lever 21 engages the screw thread 28 on shaft 29 for a rapid return. The screw thread 28 on shaft 29 as seen in Figure 1, stops short of the left hand end of the machine so that after the rapid return is completed, the scanner idles in the starting position with the projection 27 up. It is necessary then to relatch the elements hereinafter described to cause the half nut 25 to engage the screw 15 in order to start the scanning operation once more.

The operating mechanism for the lever 21 comprises a bar 40 extending across the machine and pivotally secured at opposite ends on pin 41, 41. Pin 41 on the right hand side has also mounted thereon the lever 42 which is secured to the cross bar or plate 40 by the lock 44 so that any rotation of lever 42 about pin 41 will result in corresponding swinging of the plate or bar 40 around the pins 41.

Figures 2, 3:
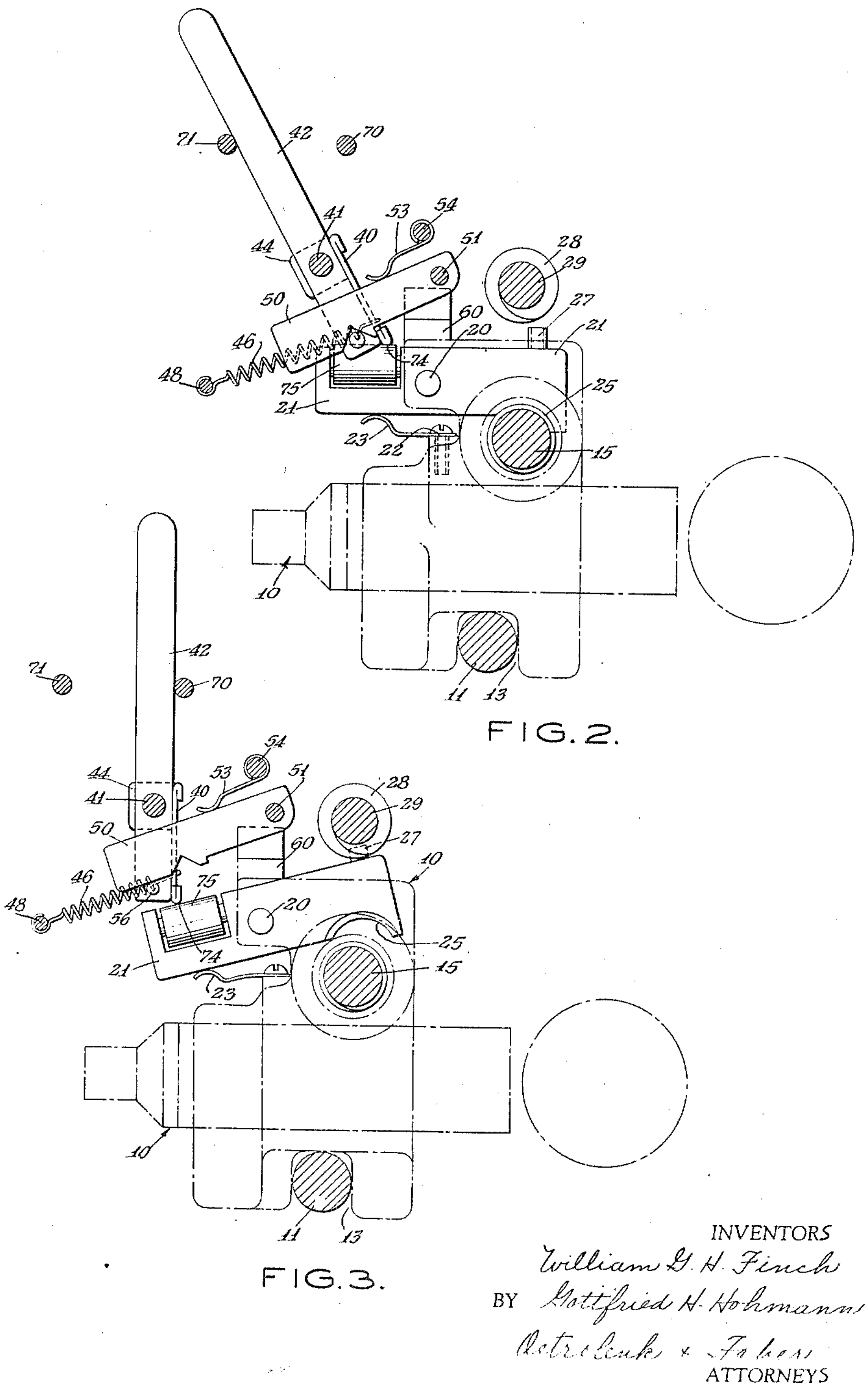
Figure 2 is a side view partly in cross section of our novel scanning system taken from line 2—2 of Figure 1, looking in the direction of the arrows and showing the scanning device in the position for ordinary slow speed scanning.
Figure 3 is a view corresponding to that of Figure 2 showing, however, the feeding elements of the scanning device arranged for the quick return.
Figure 5:
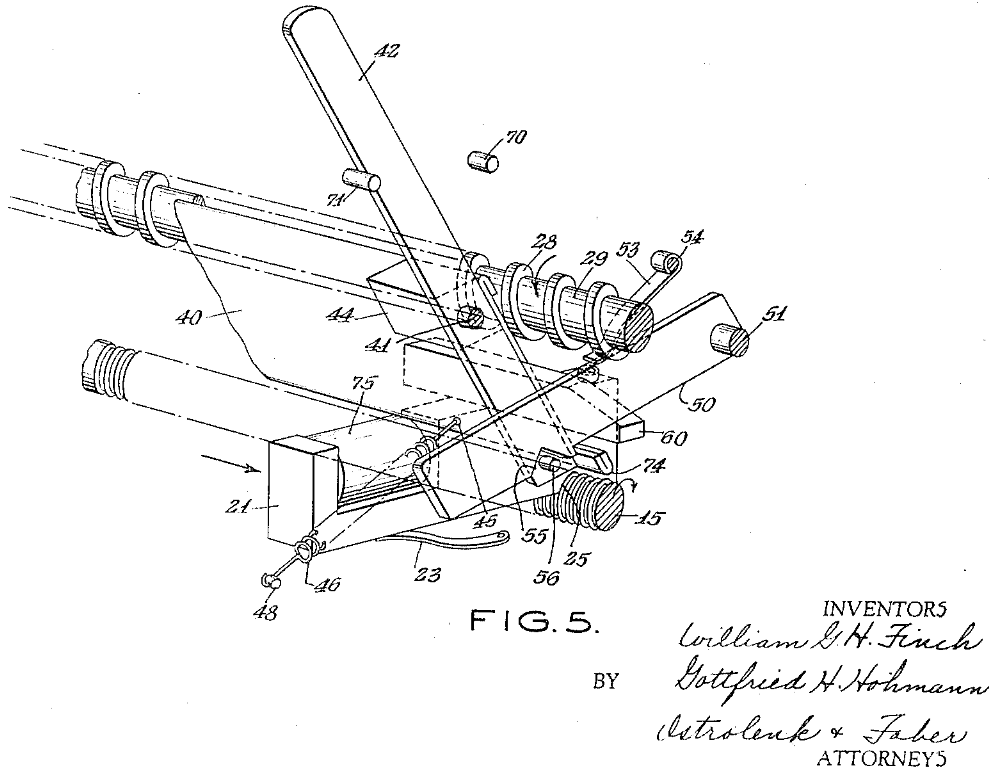
Figure 5 is a view in perspective corresponding to the view of Figure 2, showing the arrangement of our novel scanning device for scanning operation with the elements approaching the position for tripping the operating element into the quick return position.

A tension spring 46 is secured at 47 to the lower end of the plate 40 on the right hand side and is secured at 48 to a stationary part of the right hand side frame member 12 so that ordinarily the plate 40 is biased into counterclockwise rotation with respect to Figures 2 and 5. This rotation is resisted by the latch lever 50 which lever is pivotally mounted on the pin 57 carried by the side frame member 12 on the right side. Latch member 50 is biased into downward or counterclockwise rotation by the lever spring 53 supported on pin 54 also carried by the right hand side frame member 12.

Figure 4:
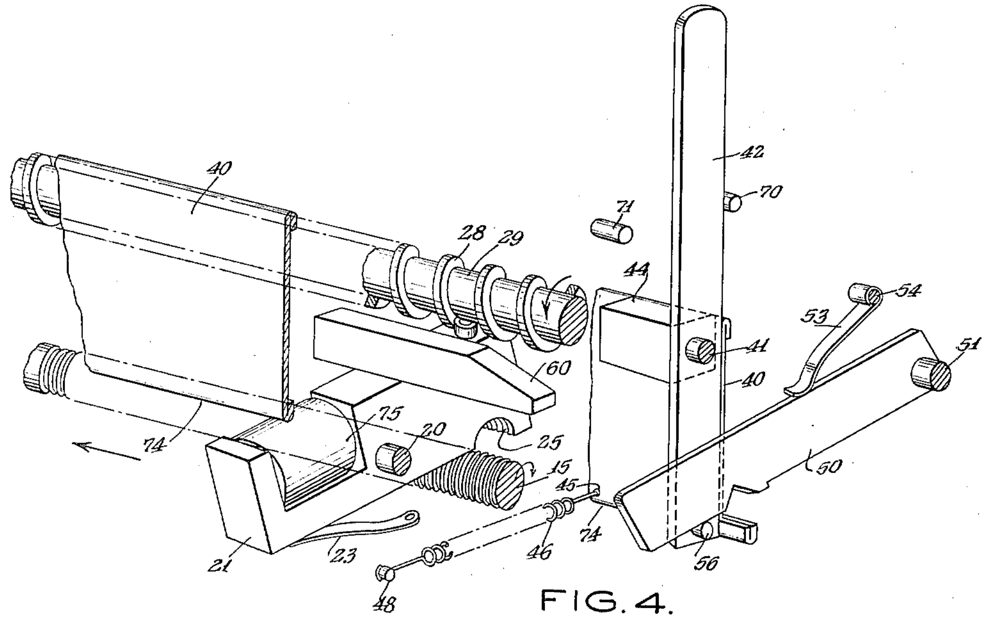
Figure 4 is a view in perspective corresponding to that of Figure 3 showing the position of the elements of our novel scanning device for a quick return.

Latch member 50 has at its outer end the detent latching surface 55 which engages the pin 56 on the lower end of the lever 42 so as ordinarily to prevent the lever 42 and its plate 40 from moving in response to the bias of spring 46 from the position of Figures 2 and 5 to the positions of Figures 3 and 4.

The upper surface of the housing 10 for the scanning system is provided with the cam 60, the said cam 60 being so arranged that it will move under and lift the latch member 50 at the completion of a scanning operation.

As shown in Figures 4 and 5, as the cam 60 together with the scanning housing approaches the end of a scanning operation, the cam surface moves under the latch lever 50 and raises the latch lever 50 so that the detent surface 55 disengages the pin 56 on the lower end of the lever 42. This now permits the spring 46 to pull the plate 40 and the lever 42 from the position of Figures 2 and 5 to cause them to rotate in a clockwise direction to the positions of Figures 3 and 4.

The stationary pins 70 and 71 carried by the right hand side frame member 12 limit the movement of the lever 42 and hence of the plate 40 between the positions of Figures 2 and 5 on one hand and Figures 3 and 4 on the other. When the lever 42 on the plate 40 is now pulled in a clockwise direction to the position in Figures 3 and 4, the lower edge 74 of plate 40 bears against the roller 75 on the lever 21 and causes the lever 21 to rotate in a counterclockwise direction around its pivot 20. The spring 46 is more powerful than the spring 23 so that this result may occur. This lifts the half nut 25 off of the scanning screw 15 and inserts the upper projection 27 into the thread 28 of the return screw 28—29 for a quick return.

The roller 75 combined with the length of the plate 40 permits the lever 21 to be thus depressed during the entire return stroke so that the scanning device 10 will be carried all the way back. When the scanning device reaches the left hand position at the beginning of a scanning line it leaves the thread 28 on the shaft 29 and is thus in an idling position ready for the resumption of the scanning operation. In order to start the scanning operation again, the lever 42 is rotated from the position of Figures 3 and 4 in a counterclockwise direction back to the position of Figures 2 and 5 against the tension of spring 46. This causes the pin 56 at the lower end of the lever 42 to be reengaged in the latching detent of the latch member 50 and thus holds the plate 40 in the position of Figures 2 and 5 so that the spring 23 may rotate the lever 21 to a position where the half nut 25 engages the scanning screw 15.

At the completion of the scanning operation, the cam 60 again trips the latch lever 50 to cause the plate 40 to rotate from the position of Figures 2 and 5 to the position of Figures 3 and 4 to effect a return of the scanning device.

Our device is also so arranged that the scanning device 10 may be returned before the completion of a scanning stroke simply by manually moving the lever 42 from the position of Figures 2 and 5 to the positions of Figures 3 and 4. This can be done because the latching spring 53 and the latching surface 55 are so arranged that the exertion of a manual force on lever 42 which is somewhat greater than the force exerted by spring 46 will permit the latch lever 50 to be raised out of engagement with the latching pin 56.

By means of the foregoing, it will thus be seen that a simplified scanning system is provided wherein the scanning device may be fed longitudinally of the drum at ordinary scanning speed and whereby the scanning device will be ordinarily returned to the initial position at the completion of the scanning operation and without the intervention of any manual control. On the completion of the return, the scanning device will idle in the starting position until the lever 42 is tripped to permit the scanning device to reengage the scanning screw for a scanning operation.

Our novel scanning device is also so arranged that it may be tripped out of engagement with the feed screw at any point during the scanning operation and when tripped out of engagement with the feed screw, may be returned to the initial position.

In the foregoing, we have described our invention solely in connection with an illustrative embodiment thereof. Since many variations and modifications of our invention will now be obvious to those skilled in the art, we prefer to be bound, not by the specific disclosures herein contained, but only by the appended claims.

We claim:

1. A scanning unit for facsimile apparatus, said facsimile apparatus comprising a rotatable drum, said scanning unit being mounted for longitudinal movement parallel to the axis of said drum while said drum rotates to scan a helical trace on said drum; a first rotatable screw for moving said scanning unit at scanning speed longitudinally of said drum in one direction; a second rotatable screw for moving said scanning unit at a relatively greater speed in the opposite direction back to the beginning of the scanning stroke; said first rotatable screw extending parallel to the drum and parallel to the path of movement of the scanning unit; means on said scanning unit engaging said first screw; said second rotatable screw extending parallel to the first screw, said second screw having a relatively greater pitch than said first screw; additional means on said scanning unit engageable with said second screw; a movable bar on said scanning unit; the aforesaid means on said scanning unit for engaging the first screw and the aforesaid means on said scanning unit for engaging the second screw being mounted on said bar, said bar being movable between two selected positions in each of which only one screw is engaged.

2. A scanning unit for facsimile apparatus, said facsimile apparatus comprising a rotatable drum, said scanning unit being mounted for longitudinal movement parallel to the axis of said drum while said drum rotates to scan a helical trace on said drum; a first rotatable screw for moving said scanning unit at scanning speed longitudinally of said drum in one direction; a second rotatable screw for moving said scanning unit at a relatively greater speed in the opposite direction back to the beginning of the scanning stroke; said first rotatable screw extending parallel to the drum and parallel to the path of movement of the scanning unit; means on said scanning unit engaging said first screw; said second rotatable screw extending parallel to the first screw, said second screw having a relatively greater pitch than said first screw; additional means on said scanning unit engageable with said second screw; a movable bar on said scanning unit; the aforesaid means on said scanning unit for engaging the first screw and the aforesaid means on said scanning unit for engaging the second screw being mounted on said bar, said bar being movable between two selected positions in each of which only one screw is engaged; and means operable on the end of a scanning stroke automatically to move said bar to disengage the first screw and engage the second screw.

3. A scanning unit for facsimile apparatus, said facsimile apparatus comprising a rotatable drum, said scanning unit being mounted for longitudinal movement parallel to the axis of said drum while said drum rotates to scan a helical trace on said drum; a first rotatable screw for moving said scanning unit at scanning speed longitudinally of said drum in one direction; a second rotatable screw for moving said scanning unit at a relatively greater speed in the opposite direction back to the beginning of the scanning stroke; said first rotatable screw extending parallel to the drum and parallel to the path of movement of the scanning unit; means on said scanning unit engaging said first screw; said second rotatable screw extending parallel to the first screw, said second screw having a relatively greater pitch than said first screw; additional means on said scanning unit engageable with said second screw; a movable bar on said scanning unit; the aforesaid means on said scanning unit for engaging the first screw and the aforementioned means on said scanning unit for engaging the second screw being mounted on said bar; said bar being movable between two selected positions in each of which only one screw is engaged; and manually operable means for causing said bar to disengage one screw and engage the other screw.

4. A scanning unit for facsimile apparatus, said facsimile apparatus comprising a rotatable drum, said scanning unit being mounted for longitudinal movement parallel to the axis of said drum while said drum rotates to scan a helical trace on said drum; a first rotatable screw for moving said scanning unit at scanning speed longitudinally of said drum in one direction; a second rotatable screw for moving said scanning unit at a relatively greater speed in the opposite direction back to the beginning of the scanning stroke; said first rotatable screw extending parallel to the drum and parallel to the path of movement of the scanning unit; means on said scanning unit engaging said first screw; said second rotatable screw extending parallel to the first screw, said second screw having a relatively greater pitch than said first screw; additional means on said scanning unit engageable with said second screw; a movable bar on said scanning unit; the aforesaid means on said scanning unit for engaging the first screw and the aforesaid means on said scanning unit for engaging the second screw being mounted on said bar; said bar being movable between two selected positions in each of which only one screw is engaged; manually operable means for causing said bar to disengage one screw and engage the other screw; said manually operable means comprising a plate extending parallel to the path of movement of the scanning unit; said plate bearing against the bar carried by said scanning unit; a handle connected to said plate for moving said plate between two selected positions, movement of said plate to one of said selected positions causing said bar to engage one of said screws and movement of said plate to the other of said selected positions permitting said bar to engage the other of said screws.

5. A scanning unit for facsimile apparatus, said facsimile apparatus comprising a rotatable drum, said scanning unit being mounted for longitudinal movement parallel to the axis of said drum while said drum rotates to scan a helical trace on said drum; a first rotatable screw for moving said scanning unit at scanning speed longitudinally of said drum in one direction; a second rotatable screw for moving said scanning unit at a relatively greater speed in the opposite direction back to the beginning of the scanning stroke; said first rotatable screw extending parallel to the drum and parallel to the path of movement of the scanning unit; means on said scanning unit engaging said first screw; said second rotatable screw extending parallel to the first screw, said second screw having a relatively greater pitch than said first screw; additional means on said scanning unit engageable with said second screw; a movable bar on said scanning unit; the aforesaid means on said scanning unit for engaging the first screw and the aforesaid means on said scanning unit for engaging the second screw being mounted on said bar; said bar being movable between two selected positions in each of which only one screw is engaged; manually operable means for causing said bar to disengage one screw and engage the other screw; said manually operable means comprising a plate extending parallel to the path of movement of the scanning unit; said plate bearing against the bar carried by said scanning unit; a handle connected to said plate for moving said plate between two selected positions, movement of said plate to one of said selected positions causing said bar to engage one of said screws and movement of said plate to the other of said selected positions permitting said bar to engage the other of said screws; and spring means biasing said bar against the other of said screws.

6. A scanning unit for facsimile apparatus, said facsimile apparatus comprising a rotatable drum, said scanning unit being mounted for longitudinal movement parallel to the axis of said drum while said drum rotates to scan a helical trace on said drum; a first rotatable screw for moving said scanning unit at scanning speed longitudinally of said drum in one direction; a second rotatable screw for moving said scanning unit at a relatively greater speed in the opposite direction back to the beginning of the scanning stroke; said first rotatable screw extending parallel to the drum and parallel to the path of movement of the scanning unit; means on said scanning unit engaging said first screw; said second rotatable screw extending parallel to the first screw, said second screw having a relatively greater pitch than said first screw; additional means on said scanning unit engageable with said second screw, a movable bar on said scanning unit; the aforesaid means on said scanning unit for engaging the first screw and the aforesaid means on said scanning unit for engaging the second screw being mounted on said bar; said bar being movable between two selected positions in each of which only one screw is engaged; manually operable means for causing said bar to disengage one screw and engage the other screw; said manually operable means comprising a plate extending parallel to the path of movement of the scanning unit; said plate bearing against the bar carried by said scanning unit; a handle connected to said plate for moving said plate between two selected positions, movement of said plate to one of said selected positions causing said bar to engage one of said screws and movement of said plate to the other of said selected positions permitting said bar to engage the other of said screws; spring means biasing said bar against the other of said screws; spring means biasing said plate in one of said selected positions; and latch means for holding said plate in the other of said selected positions against said spring biasing means.

7. A scanning unit for facsimile apparatus, said facsimile apparatus comprising a rotatable drum, said scanning unit being mounted for longitudinal movement parallel to the axis of said drum while said drum rotates to scan a helical trace on said drum; a first rotatable screw for moving said scanning unit at scanning speed longitudinally of said drum in one direction; a second rotatable screw for moving said scanning unit at a relatively greater speed in the opposite direction back to the beginning of the scanning stroke; said first rotatable screw extending parallel to the drum and parallel to the path of movement of the scanning unit; means on said scanning unit engaging said first screw; said second rotatable screw extending parallel to the first screw, said second screw having a relatively greater pitch than said first screw; additional means on said scanning unit engageable with said second screw; a movable bar on said scanning unit; the aforesaid means on said scanning unit for engaging the first screw and the aforesaid means on said scanning unit for engaging the second screw being mounted on said bar; said bar being movable between two selected positions in each of which only one screw is engaged; manually operable means for causing said bar to disengage one screw and engage the other screw; said manually operable means comprising a plate extending parallel to the path of movement of the scanning unit; said plate bearing against the bar carried by said scanning unit; a handle connected to said plate for moving said plate between two selected positions, movement of said plate to one of said selected positions causing said bar to engage one of said screws and movement of said plate to the other of said selected positions permitting said bar to engage the other of said screws; spring means biasing said bar against the other of said screws; spring means biasing said plate in one of said selected positions; latch means for holding said plate in the other of said selected positions against said spring biasing means; a cam carried by said scanning unit, said cam engaging said latch and releasing said plate for movement under said spring bias at the end of a scanning stroke.

WILLIAM G. H. FINCH.
GOTTFRIED H. HOHMANN.

REFERENCES CITED

The following references are of record in the file of this patent:

UNITED STATES PATENTS

| Number | Name | Date |
|---|---|---|
| 2,262,715 | Wise | Nov. 11, 1941 |
| 2,311,803 | Wise | Feb. 23, 1943 |